UNITED STATES PATENT OFFICE.

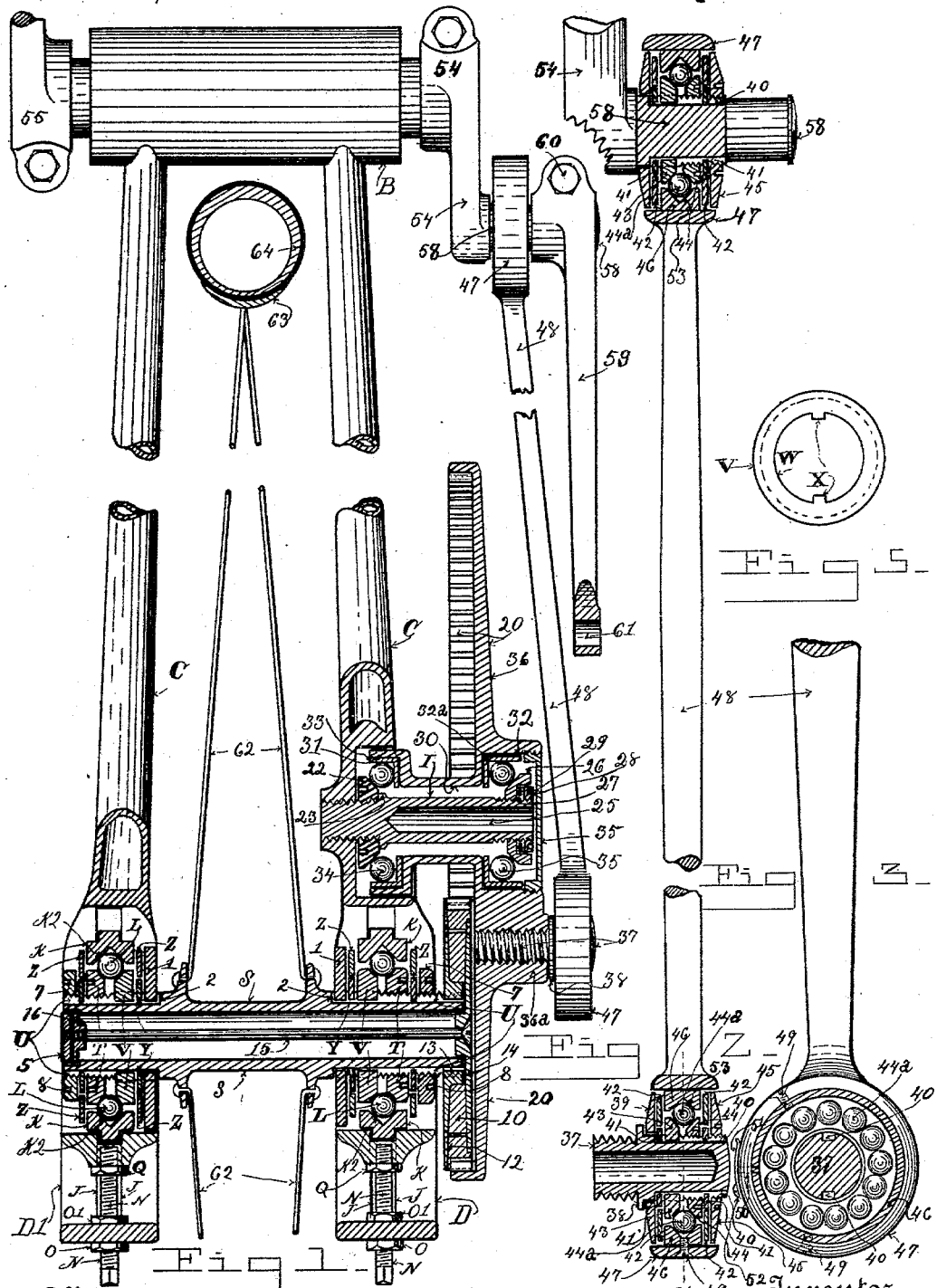

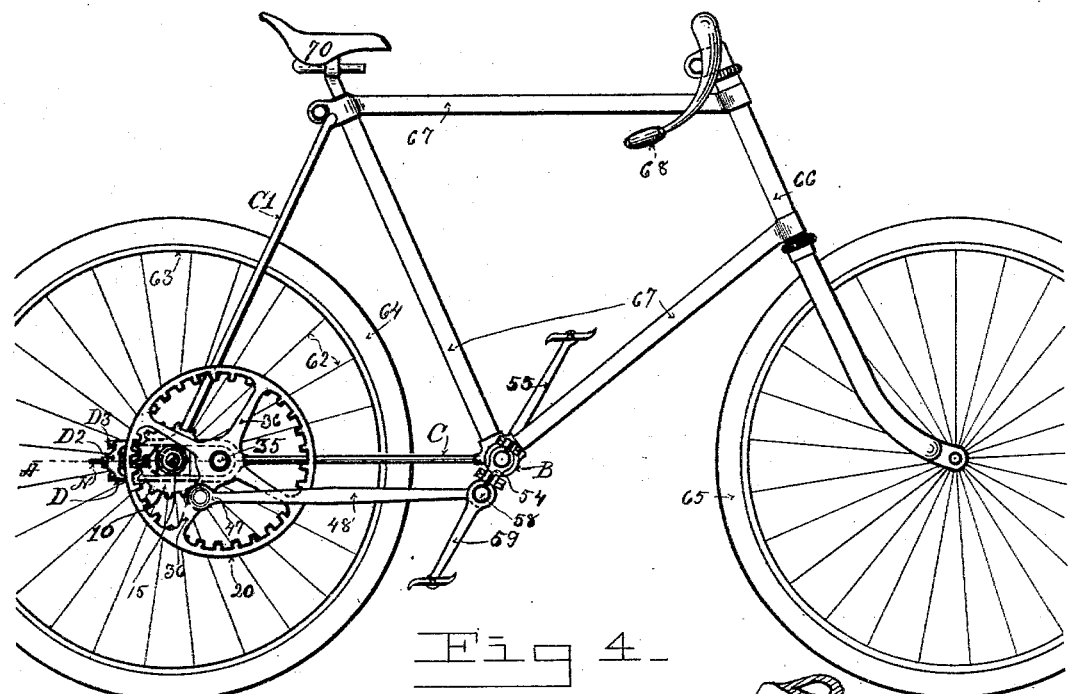
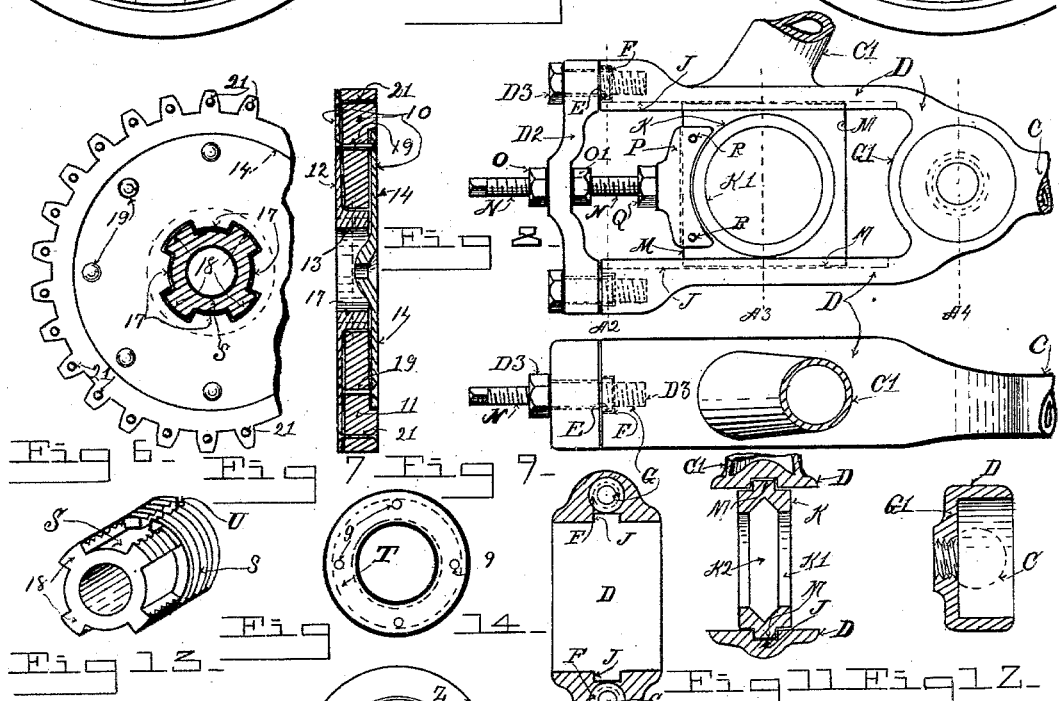

WALTER H. G. KING, OF DENVER, COLORADO.

BICYCLE DRIVING-GEAR.

SPECIFICATION forming part of Letters Patent No. 602,906, dated April 26, 1898.

Application filed August 30, 1897. Serial No. 649,989. (No model.)

*To all whom it may concern:*

Be it known that I, WALTER H. G. KING, a citizen of the United States of America, residing at Denver, in the county of Arapahoe and State of Colorado, have invented certain new and useful Improvements in Bicycle Driving-Gears; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to improvements in bicycle driving mechanism; and the objects of my invention are, first, to provide a chainless bicycle driving mechanism; second, to provide a simple and positive driving mechanism; third, to provide a chainless driving mechanism that can be applied to the bicycles in use with but slight alterations in the ends of the rear-fork tubes of the bicycle-frame. I attain these objects by the mechanism illustrated in the accompanying drawings, in which—

Figure 1 is a plan view of the rear-wheel, the side-fork tubes being shown partially in section on line A of Fig. 4; Fig. 2, a plan view of the connecting-rod, showing the ball-bearing at its ends in section; Fig. 3, a side elevation of one end of the connecting-rod, showing the ball-race in section on line A' of Fig. 2; Fig. 4, a side elevation of a bicycle embodying my improved driving-gear; Fig. 5, a side elevation of one of the inside cones of the ball-bearings of the hub of the rear wheel; Fig. 6, a side elevation of the pinion and a section of the hub of the rear wheel; Fig. 7, a section of the pinion shown in Fig. 6; Fig. 8, a side elevation of a cage which forms an integral part of the terminal ends of the rear-fork tubes; Fig. 9, a top plan view of Fig. 8; Fig. 10, a section of Fig. 8 on line $A^2$; Fig. 11, a section of Fig. 8 on line $A^3$; Fig. 12, a section of Fig. 8 on line $A^4$; Fig. 13, a perspective view of the end of the rear wheel's hub that supports its driving-pinion; Fig. 14, a side elevation of one of the outside cones of the ball-bearings of the hub of the rear wheel, and Fig. 15 a side elevation of the steel ring and the felt dust-proof ring which are placed against the outside of the cones of the ball-bearings and a section of the hub of the rear wheel.

Similar letters and figures of reference refer to similar parts throughout the several views.

Referring to Fig. 1, B designates the crank-hanger; C, the lower-fork tubes.

D and D' designate two cages which are formed integrally with the terminal ends of the lower-fork tubes and the rear-fork tubes C'. These two cages are different from one another. Thus the cage D is made longer than the cage D'. These cages (see Figs. 8 to 12, inclusive) comprise a rectangular yoke-shaped member with a cap piece $D^2$, which is secured by cap-screws $D^3$ to the ends of each cage. The caps are provided with trunnions E, which fit into counterbored holes F, which are bored concentric to the threaded holes G, which receive the cap-screws. The cage D differs from the cage D' in having at its end adjacent to the lower-fork tube a partition G', through the center of which is a threaded hole which is surrounded by a hub. In this hub is screwed a stud I, which supports the internal gear and its ball-bearings. Each cage is provided upon the inside of its opposing sides and centrally of their width with a guide-slot J, which extends from its ends along the greater portion of its length. In these slots is fitted a cross-head K, which is provided centrally with a hole K', the inner periphery of the surface of which is provided with a V-shaped groove $K^2$, which is adapted to form a raceway for the balls L. Centrally of the cross-head and around its outside edges I form a projecting guide-rib M, which extends from the bottom and top ends into the guide-slots in the cages.

Through the center of each cap I thread a stud N, upon which are mounted check-nuts O and O' in positions to bear upon opposite sides of the cap. These studs thread into blocks P and are secured thereto against unscrewing by check-nuts Q. The face of the blocks is grooved to straddle and fit over the guide-ribs M of the cross-head. The opposite ends of the blocks P are secured to the guide-ribs M by pins R, which are driven through both the blocks and the guide-ribs. The hub S of the rear wheel is mounted centrally in the cross-heads. At each end a thread is cut to receive the outside cone T. Two key-slots U are also cut on opposite sides of each end of the hub. The inner cone V, which is shown in side elevation in Fig. 5, passes freely over the threaded end of the hub. This cone is provided on opposite sides of the hole W, formed through it, with depending key portions X, which fit loosely in the key-slots U. They prevent the cone from turning on the hub. On the outside of this cone and around the hub I place a steel ring Y, which is also provided with depending key portions adapted to fit loosely in the keyways of the hub. Around this steel ring I place a felt ring Z, which I use as a dust-guard. This felt ring is large enough to bear against the sides of the cone and the cross-head and cover the space between them. Back of the felt and steel rings I place a metal ring 1, which bears against a shoulder 2, formed on the hub. This ring 1 acts as a bearing for the cone V and the felt and steel rings. A second cone T, which is illustrated in Figs. 1 and 14, is threaded centrally to screw on the end of the hub to a position to support, with the cone V, a circular row of balls L. By the side of this cone around the hub I place a second steel ring Y, which has depending key portions which fit loosely into the keyways of the hub, and around this ring I place a dust-guard ring of felt Z, similar to the one on the opposite side of the ball-bearing. These rings are similar to the rings on the opposite side of the cone V. Upon the end of the hub I screw a nut 7, which may be of either round or hexagon form. This nut is provided with oppositely-arranged holes 8, which extend partially through it. These holes are adapted to receive the ends of a suitable spanner-wrench, by means of which the nut may be turned to tighten or loosen the cones V and T and the felt and steel rings between the ring 1 and this nut to a suitable operative relation to the balls and to one another. The cone T is also provided with spanner-wrench holes 9.

Both ball-bearings of the hub of the rear wheel are exactly alike, and the corresponding parts of both bearings are designated by the same reference letters or numerals.

The end of the hub that is supported by the cage D extends beyond its ball-bearings, and upon its ends I mount a rawhide pinion 10. In order to adapt a pinion of this material to the requirements of a bicycle driving-gear, I construct it as follows: Upon one side of a disk 11, of rawhide, I place a disk of metal 12, which is provided with a hollow hub 13. This hub extends into a hole formed centrally in the rawhide disk. The hole 13 in the hub of the disk 12 is provided with four depending integral keys 17, and the end of the hub of the rear wheel is provided with four keyways 18, adapted to fit the keys of the hub 13 loosely, as shown in Figs. 1 and 6. On the opposite side of the rawhide disk from the disk 12 I place a metal disk 14, which has a hub adapted to extend into the end of the hollow hub of the rear wheel, through the center of which extends a bolt 15. This bolt is provided with a screw-driver head which is set in flush with the face of the pinion, and the bolt extends to and through a nut 16 and a check-nut 5, which is fitted into a counterbore in the opposite end of the hub of the rear wheel. These two metal disks are secured to the rawhide disk by rivets 19. The disk 12 extends to the apex of the pinion's teeth, but the disk 14 extends only to near the bottom of the teeth of the pinion. The pinion is positioned relative to the internal gear 20 so that the rawhide teeth of the pinion contact with the metal teeth of the internal gear and so the flange 12 does not contact with them. By this means a practically-noiseless-running internal gear and pinion are provided, as well as a pair of gears in which the teeth of one of the pair are in a measure resilient and yielding, which is a valuable feature in a bicycle driving-gear in which gears are used, as it eases and softens the continuous concussion and vibration of the machine upon its rider. As the teeth of the rawhide pinion would be too pliable in their natural condition if not stiffened or supported, I secure each tooth to the disk 12 by a rivet 21, which passes through both the teeth and the disk. The internal gear 20 is mounted on ball-bearings formed around the stud I, which is screwed into the partition G' at the end of the cage D. A cone 22 is threaded to the end of this stud adjacent to the partition and is turned against a shoulder 23, formed on the stud, or, if preferred, this cone may be formed integral with the stud. A hole 25 is drilled into the opposite end of this stud to lighten it. On the outer end of the stud a thread is cut, upon which a cone 26 is threaded. This cone has a recess concentric with its center in its outer side. A washer 27 fits loosely on the stud and in this recess, and a nut 28 is threaded to the end of the stud and also enters this recess. This nut is provided with spanner-wrench-receiving holes 29. The internal gear 20 is provided with a hollow hub 30. This hub is provided with counterbores 31 and 32 at each end, in each of which is seated a right-angled ball-race $32^a$ and 33. Between each ball-race and each of the cones 22 and 26 I place a circular row of balls 34 and 35 and adjust the several parts to a suitable running tension by turning the cone. After adjustment is made the cone is secured in its set position by the nut 28. Upon the inner periphery of the entrance to the counterbore of the hub I cut a thread, to which I secure a cap 35, which I use to prevent dust entering into the ball-bearings. The toothed rim and hub of the internal gear may be united by spokes 36 or by a webbed flange. I preferably use spokes, and one of them I provide with a projecting boss $36^a$, to which I thread a stud 37. This stud is hollow to near its front end to lighten it. Adjacent to its threaded end I form a collar 38, which is screwed against the boss of the spoke.

On the opposite side of the collar a ring 39 is loosely mounted. The stud is provided on opposite sides of its front end with keyways 40. A steel ring 41 fits loosely over the stud and against the ring 39. This ring 41 has depending keys that fit into the keyways of the stud. Around this ring 41 I place a felt dust-guard ring 42. Next to these rings I place a cone 43, which slips freely over the stud and has depending keys that project loosely into the keyways of the stud. A second cone 44 is threaded to the stud, and a steel ring and felt dust-guard ring are placed at its side on the stud similar to those just described. A nut 45 is threaded on the end of the stud to hold the felt and steel rings against the cone 44 and the ball-raceway 46. This ball-raceway 46 comprises a circular ring which is fitted tightly in a round loop 47, which forms the terminal end of that end of the connecting-rod 48 that connects to the stud. The raceway is secured against accidental displacement from the loop by the screws 49. At the top of the loop I drill an oil-hole 50 and secure a cover 51 over it by a screw 52. The inner periphery of the raceway 46 is provided with a V-shaped groove 53, around which and around the cones 43 and 44 a row of balls 44ᴬ is placed, which form a ball-bearing for the connecting-rod on the stud 37. The opposite end of the connecting-rod 48 connects to a crank 54, and this end of the connecting-rod is provided with a loop which contains a ball-bearing similar to the ball-bearing of the opposite end. Driving-cranks 55 and 54 are placed on opposite sides of the crank-hanger B and are mounted therein in the customary manner. The crank 54 differs, however, from the crank 55, inasmuch as it is divided into two parts. The first part consists of a crank-arm 54, which has secured to it at a distance from its axial center equal to the distance of the axis of the stud 37 from the center of the internal gear a crank-pin 58. This crank-pin is arranged parallel with the axis of the hanger, and upon it is journaled one end of the connecting-rod. The crank is made longer than the length required for a bearing for the connecting-rod, and upon its outer end I clamp a short crank 59, which has a split hub arranged to be clamped to the pin by a bolt 60. The outer end of this crank 59 is provided with a hole 61, to which a pedal may be bolted. The combined length of the cranks 54 and 59 would be equal to the length of the opposite crank 55.

In Fig. 4, which is a side elevation of a bicycle, 62 designates the spokes of the rear wheel; 63, the rim; 64, the tire. 65 is the front wheel; 66, the steering-head. 67 designates the main tubes of the frame; 68, the handle-bars, and 70 the saddle, these several parts being similar in construction and arrangement to bicycles in common use.

The operation of my improved bicycle driving-gear is as follows: The cranks are rotated by the rider in the usual manner and impart a reciprocal rotary motion to the connecting-rod which rotates the internal gear. The internal gear meshes with the pinion and rotates it, and consequently the rear wheel, to the hub of which the pinion is secured. It will be noticed in Fig. 4 that when the driving-cranks stand in substantially a vertical plane, which is the position of their dead-centers relative to the rider, that the connecting-rod stands at substantially the point of its greatest leverage from its horizontal dead-centers in its rotative path around the center of the gear. This arrangement prevents any possibility of the connecting-rod stopping on its centers, as the cranks are at the point of their greatest leverage and under the full power of the rider when the connecting-rod passes its centers. The internal gear is about two and one-half times larger in diameter than the pinion. This ratio would give substantially a seventy-two driving-gear. Several lower driving-gears can be obtained by removing this pinion and substituting for it smaller pinions. To accomplish this, the cross-heads in the cages and the hub of the rear wheel must be moved back after the pinion is placed on the hub until its teeth mesh properly with the teeth of the internal gear. This is accomplished by loosening the check-nuts on the studs of the caps and then moving the cross-heads either forward or backward in the cages, as desired, after which the cross-heads are secured rigidly to the cages by setting the check-nuts to rigidly secure the studs to the caps. A change of one-fourth of an inch in diameter of a pinion either above or below the ratio of two and one-half to the internal gear would give substantially a seventy-seven or a sixty-seven driving-gear substantially, and a change of one-half inch in diameter would give sixty-two or eighty-two driving-gear, and changes of driving-gear ranging from sixty-two to one hundred may be obtained by the adjustment afforded by the cross-heads and cages.

This driving-gear is simple, strong, and compact, and the rawhide pinions are practically noiseless and provide yielding resilient teeth which compensate for the slight springing of the frame.

Having described my invention, what I claim as new, and desire to secure by Letters Patent, is—

1. The combination of the rear-fork tubes, the cages, the cross-heads, having a ball-raceway the cross-head caps and the studs and check-nuts, and the blocks connecting the studs to the cross-heads, with the rear wheel's hub having a shoulder, a disk thereon bearing against said shoulder, a keyway in said hub; a steel ring keyed loosely to said hub and keyway; a felt dust-guard ring around said steel ring; a cone on said hub loosely keyed to said keyway; a second cone threaded to said hub and opposed to the first-named cone, a second steel ring and felt dust-guard ring at the side of said threaded cone, a circular row of balls between said cones and the raceway of said cross-head, a nut threaded to the end of said hub and means for adjusting said threaded cone and nut to maintain the several parts in operative relation, substantially as described.

2. In a bicycle driving-gear a ball-bearing comprising a V-shaped ball-raceway, two independent opposing cones mounted on a hub, stud or axle, one of which is threaded to said hub or stud and adjustable relatively to the other, a steel ring at the outside of each cone, a felt ring dust-guard surrounding said steel ring and engaging the sides of said cone and said raceway, a circular row of balls between said raceway and said cones, a laterally-supporting disk or ring on the inner side of the cone and raceway and a nut threaded to the opposite side of said raceway from said lateral support and to said hub or stud and adapted with said threaded cone to secure the various parts of the ball-bearing in operative relation, substantially as described.

3. The combination in a bicycle driving-gear of the rear-fork tubes, the cages, the rear wheel, the hub of the rear wheel extending into and through said cages and adjustably supported therein by ball-bearings, a rawhide pinion secured to the end of said hub comprising a disk of rawhide clamped between two plates, an introverted hub on one plate provided with depending keys, keyways in the end of the said hub in which said plate-keys fit, an introverted hub on the opposite plate adapted to project into the hub of said rear wheel, a bolt extending through the hub of said plate and through the hub of said rear wheel and a nut and check-nut threaded to the end of said bolt and resting against the opposite end of said rear wheel's hub, substantially as described.

In testimony whereof I affix my signature in presence of two witnesses.

WALTER H. G. KING.

Witnesses:
   JOSIAH A. FOWLER,
   WILLIAM G. KING.